United States Patent
Bauchot et al.

(10) Patent No.: US 8,243,646 B2
(45) Date of Patent: Aug. 14, 2012

(54) METHOD AND SYSTEM FOR DIGITAL COMMUNICATION THROUGH INFRASTRUCTURE NETWORK WITH RECEIVING STATIONS ACCORDING TO THEIR GEOGRAPHICAL STATUS

(75) Inventors: Frederic Bauchot, Saint-Jeannet (FR); Jean Claude Dispensa, Saint-Jeannet (FR); Gerard Marmigère, Drap (FR)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/233,160

(22) Filed: Sep. 18, 2008

(65) Prior Publication Data

US 2009/0073912 A1    Mar. 19, 2009

(30) Foreign Application Priority Data

Sep. 19, 2007    (EP) ..................................... 07301384

(51) Int. Cl.
*H04H 20/71*    (2008.01)
*H04J 3/26*    (2006.01)
(52) U.S. Cl. ........................................ 370/312; 370/432
(58) Field of Classification Search .................. 370/312, 370/432
See application file for complete search history.

(56) References Cited

U.S. PATENT DOCUMENTS

| 6,738,639 | B1 | 5/2004 | Gosselin | |
|---|---|---|---|---|
| 7,443,851 | B2 * | 10/2008 | Fukushima et al. | 370/390 |
| 7,457,619 | B2 * | 11/2008 | Ariyur et al. | 455/423 |
| 7,565,155 | B2 * | 7/2009 | Sheha et al. | 455/456.1 |
| 2002/0097718 | A1 * | 7/2002 | Korus et al. | 370/390 |
| 2004/0243741 | A1 * | 12/2004 | Shin et al. | 710/33 |
| 2006/0223534 | A1 * | 10/2006 | Newberg et al. | 455/436 |
| 2007/0140107 | A1 * | 6/2007 | Eckert et al. | 370/216 |
| 2007/0223439 | A1 * | 9/2007 | Kosai | 370/338 |
| 2007/0263571 | A1 * | 11/2007 | Hermann et al. | 370/338 |
| 2007/0293249 | A1 * | 12/2007 | Wang | 455/466 |
| 2008/0123650 | A1 * | 5/2008 | Bhaskar | 370/392 |

FOREIGN PATENT DOCUMENTS

WO    WO03040972 A1    5/2003
(Continued)

OTHER PUBLICATIONS

X.Xiang, X.Wang, and Z.Zhou, "An Efficient Geographic Multicast Protocol for Mobile Ad Hoc Networks", Proceedings of the 2006 International Symposium on a Wireless, Mobile and Multimedia, Jul. 10, 2006.*

(Continued)

*Primary Examiner* — Ayaz Sheikh
*Assistant Examiner* — Tarell Hampton
(74) *Attorney, Agent, or Firm* — Schmeiser, Olsen & Watts; Anna Linne (57) ABSTRACT

The present invention relates to a method and system of computer communication through an infrastructure multicast IP network, between one or several determined central stations and undetermined groups of receiving stations, especially mobile stations. According to the invention, every mobile station sends its geographical status, e.g. its position, in an IP unicast message to the central station. In response, the mobile station receives an IP unicast message comprising one or more IP multicast addresses corresponding to the transmitted geographical status. The central station also has the necessary routers subscribed or unsubscribed to these multicast addresses, according to the local presence of such receiving stations. Receiving stations may then subscribe such localized multicast addresses, and receive the corresponding multicast messages.

18 Claims, 8 Drawing Sheets

FOREIGN PATENT DOCUMENTS

WO    WO 2005125238 A1 * 12/2005

OTHER PUBLICATIONS

Briesemeister et al., Role-Based Multicast in Highly Mobile but Sparsely Connected Ad Hoc Networks, In Proceedings of the 1st ACM International Symposium on Mobile Ad Hoc Networking & Computing (MobiHoc), pp. 45-50. IEEE Press, Aug. 2000.

Tseng et al., Location Awareness in Ad Hoc Wireless Mobile Networks, Computer, vol. 34 Issue 6, Jun. 2001 IEEE Computer Society Press Los Alamitos, CA, USA.

Bachir et al., A Multicast Protocol in Ad Hoc Networks Inter-Vehicle Geocast, The 57th IEEE Semiannual Vehicular Technology Conference, 2003, VTC-Spring, Apr. 22-25, 2003, vol. 4, pp. 2456-2460.

Suh et al., An Efficient Multicast Routing Protocol in Wireless Mobile Networks, Wireless Networks, vol. 7, 2001, Kluwer Academic Publishers, pp. 443-453.

Ali et al., A New Multicast-Based Architecture to Support Host Mobility in IPv6, The 9th Asia-Pacific Conference on Communications, 2003, APCC 2003, Sep. 21-24, 2003, vol. 2, pp. 623-629.

* cited by examiner

METHOD AND SYSTEM FOR DIGITAL COMMUNICATION THROUGH INFRASTRUCTURE NETWORK WITH RECEIVING STATIONS ACCORDING TO THEIR GEOGRAPHICAL STATUS

FIELD OF THE INVENTION

The present invention relates to the field of computer communication through an infrastructure multicast IP network between a determined station or several central stations and possibly undetermined groups of receiving stations. The case of mobile receiving stations is a particular field of this invention, which moreover, relates to the management of router devices operating such a network.

BACKGROUND OF THE INVENTION

The problem of addressing to a group of persons or stations according to their geographical position or interest may arise in many situations, and has been addressed in different manners.

Classic radio solutions exist for talking to several vehicles, such as taxis in a town. For talking to taxi drivers that are near a specific place, a central operator may give a general voice call with the name of the place, and only concerned drivers answer to the call. In order to avoid many drivers receiving a call for a place they are not near enough, different channels may be defined related to different zones. Each driver then tunes its receiver on the channel he is entering or interested in, but he has to know the identification of each of these channels.

Computerized solutions have been proposed, which may automate such knowledge and tuning, and sometimes use IP multicast technologies such as in WO03040972. However, receiving stations still have to be customized for memorizing different channel identifications, and update such identifications as time goes by. Also, deploying and maintaining such a data infrastructure network is something quite complex, costly and time consuming. Moreover, known techniques for IP multicast data frames are not always adapted to specificities of geographical groups or mobile receiving stations, while reducing or optimizing data traffic on such a network is always a matter of interest.

SUMMARY OF THE INVENTION

There is provided a method for selectively communicating through an infrastructure IP network with a group of computerized receiving stations according to their geographical status, the method comprising the steps of: at least one receiving station transmitting an IP unicast message, termed geographical message, to a central station, the geographical message representing a current geographical status of the receiving station; processing the geographical status for issuing at least one multicast IP address, termed joining address, associated with a multicast group related to the geographical status; and transmitting an IP unicast message, termed joining message, including the at least one such multicast IP address, to the at least one receiving station.

There is provided a method for implementing a location-aware service, comprising the steps of: receiving at least one service request related to a given geographical requested zone; computing at least one IP multicast group related to the requested zone; communicating with at least one computerized mobile receiving station of a geographical status related to the requested zone, wherein the step of communicating with least one computerized mobile receiving station is carried out through a method for selectively communicating through an infrastructure IP network with a group of computerized receiving stations according to their geographical status, the method comprising the steps of: at least one receiving station transmitting an IP unicast message, termed geographical message, to a central station, the geographical message representing a current geographical status of the receiving station; processing the geographical status for issuing at least one multicast IP address, termed joining address, associated with a multicast group related to the geographical status; and transmitting an IP unicast message, termed joining message, including the at least one such multicast IP address, to the at least one receiving station.

There is provided a mobile communication device comprising means adapted for carrying out the steps of a method for selectively communicating through an infrastructure IP network with a group of computerized receiving stations according to their geographical status, the method comprising the steps of: at least one receiving station transmitting an IP unicast message, termed geographical message, to a central station, the geographical message representing a current geographical status of the receiving station; processing the geographical status for issuing at least one multicast IP address, termed joining address, associated with a multicast group related to the geographical status; and transmitting an IP unicast message, termed joining message, including the at least one such multicast IP address, to the at least one receiving station.

There is provided a computer system comprising means adapted for carrying out the steps of a method for managing a selective communication through a wireless infrastructure IP network with a group of computerized mobile receiving stations according to their geographical status, the method comprising the steps of: receiving an IP unicast message termed geographical message in a central station, the geographical message representing a current geographical position of at least one such mobile station; processing the geographical position for issuing at least one IP multicast address, termed joining address, associated with a multicast group related to the geographical position; determining at least one router device on a communication route from the central station to at least one wireless communication base station capable of communicating with the mobile station; and transmitting the joining address to the at least one router device in an IP unicast message, termed subscribing message, the subscribing message including a command for the router device to receive and manage IP multicast data frames directed to the joining address.

There is provided a computer program comprising instructions for carrying out the steps of a method for selectively communicating through an infrastructure IP network with a group of computerized receiving stations according to their geographical status, wherein the computer program is executed on a computerized system or device and the method comprising the steps of: at least one receiving station transmitting an IP unicast message, termed geographical message, to a central station, the geographical message representing a current geographical status of the receiving station; processing the geographical status for issuing at least one multicast IP address, termed joining address, associated with a multicast group related to the geographical status; and transmitting an IP unicast message, termed joining message, including the at least one such multicast IP address, to the at least one receiving station.

BRIEF DESCRIPTION OF THE DRAWINGS

The new and inventive features believed to be characteristics of the invention are set forth in the appended claims. The invention itself, however, as well as a preferred mode of use, further objectives and advantages thereof, will best be understood by reference to the following detailed description of an illustrative detailed embodiment when read in conjunction with the accompanying drawings, wherein:

In the following specifications, elements common to several figures are referenced through a common identifier.

DETAILED DESCRIPTION OF THE INVENTION

It is an objective of the present invention to enable communicating with geographical dependent groups of stations, including highly mobile stations, while limiting reception of non-relevant messages by non-concerned stations. Other objectives comprise enabling:

stations' use of standardized devices or devices that are simple to configure;
  a transparent use for the stations users with regard to the network structure and evolution;
  communication with a limited dependence to number of receiving stations; or
  communication with non-personalized or lowly personalized stations, or limiting the subscribing or tuning constraints.

Another objective is to enable using existing IP network architectures and/or infrastructures, in a transparent manner and without interfering with its management, and with few or no dependence on the evolution of such network and of their internal operating matter. Moreover, reducing or optimizing data traffic as well as signalisation traffic generated by such a communication may be interesting.

The invention is disclosed as described with the appended claims. Such objectives are accomplished through a method for selectively communicating through an infrastructure IP network with a group of computerized receiving stations according to their geographical status.

According the invention, this method comprises the steps of:

at least one receiving station transmitting an IP unicast message, termed geographical message, to a central station. Such geographical message may be emitted periodically or on given events, and represent a current geographical status of the receiving station;
  processing the geographical status for issuing at least one multicast IP address, termed joining address, associated with a multicast group related to this geographical status; and
  transmitting an IP unicast message, termed joining message, including the at least one such multicast IP address, to the at least one receiving station.

According to the embodiments, or to the current situation or parameters of the network or of the receiving stations, the geographical message may be emitted under different conditions. A geographical message may be emitted by each receiving station when turning on its communicating device or when joining the geographical multicast network system. The receiving station may then emit a periodically repeated geographical message, on a schedule possibly dependent of its speed characteristics and of the size of geographical zones to be identified, or a ratio of such characteristics. Such emitting may also depend on specific events, such as a travelled distance, or a manual request, or a computed updating event.

Preferably, the joining message is emitted from the central station, or by a proxy, thus enabling use of the existing network without interfering with its internal management. This method may comprise the further step of automatically configuring the at least one receiving station for receiving IP multicast data directed to the joining address and transmitted on this wireless infrastructure IP network, e.g. multicast data frames including this at least one multicast IP address as destination address.

Another further step may be automatically configuring the at least one receiving station for not receiving anymore IP multicast data directed to at least one IP multicast address not anymore related to the current geographical status of said receiving station. Such a de-tuning may be done, for instance, in response to an explicit suppress command defining one or several addresses to relinquish. In an embodiment where the joining message comprises an exhaustive list of one or several addresses to receive, this de-tuning is done on all addresses not comprised within such a list.

After the joining message, once the receiving station is tuned to the current multicast addresses, it will receive all messages transmitted on this or these addresses and only these messages. Thus, every receiving station, including mobile stations, receives only messages that are relevant to its current geographical status, e.g. its current position or a future position.

Such a receiving station, user or device, does not need to have an a priori knowledge of the addresses used within the network. Stations may be produced based on standardized devices with a uniform and simple configuration, no unwanted subscribing or tuning constraints. Use and configuration is then transparent for the stations users with regard to the network structure and evolution.

For one or several stations, acting as or communicating with the central station, communicating with every receiving stations of a given geographical status is then possible in a simple way. They just have to send an IP message towards the IP multicast address corresponding to the targeted geographical status, and such sending does not depend on the number nor identity of such stations.

Such a geographical status may take several forms. In the embodiment detailed hereafter, the at least one receiving station is a wireless communicating mobile station and transmits a geographical message which includes geographical data related to its current geographical status of said mobile receiving station. This geographical status may be provided by known spatial or geographical positioning means such as GPS or inertial station, or be computed from external detection, such as identifying a given base station or other localized items.

The geographical status transmitted for a mobile receiving station may comprise:
- its geographical position or geographically significant information or identification of geographically significant detected items;
- its presence within a given geographical zone termed cell;
- its geographical destination;
- its geographical origin; or
- characteristics of its movement or journey.

In the present specifications, the term geographical may also be understood as involving 3-dimensional spatial positions, e.g. in a building, or an underground or underwater zone, or in the air for a flying device or vehicle. The transmitted current geographical status may also pertain to a future or past geographical status. As an example, it could be an availability or interest for any geographically dependant information or operation, such as for making appointment for a future stay or journey. Another example could be for studying status of a past position or journey, such as searching for vehicles which were present in a given place at a given time.

Using such geographical "virtual" status may be an example of an embodiment including receiving stations of mobile and fixed type. Particularly, the step of transmitting a joining message to the at least one receiving station is accomplished in response to its geographical status newly involving a given geographical zone, such as mobile station entering it or taking it as a destination or waypoint. This step of transmitting a joining message to the receiving station may also be accomplished in response to its newly relinquishing a given geographical zone, such as leaving it or cancelling it as destination or waypoint.

Also, it may be accomplished in response to a change of availability of a receiving station within the cell, such as activating or turning off the communication program or device. Preferably, the joining message comprises a plurality of IP multicast addresses associated with a plurality of multicast groups related to the geographical status of the at least one receiving station. Moreover, such a plurality of multicast groups may comprise:
- at least one group relating to a given zone, termed current cell, including the geographical position of the at least one receiving station, and
- at least one group relating to a zone neighbouring said geographical position or otherwise relating to the geographical status of said receiving station, e.g. destination, transit place or way.

In the various embodiments comprising wireless mobile receiving stations, such a communication method enables implementing a method for managing the involved wireless infrastructure IP network as disclosed hereafter. Reciprocally, this management method enables greatly optimizing the implementation of the described communication method throughout wireless infrastructure IP networks in their current and probably future architecture.

The invention also provides a method for managing a selective communication through a wireless infrastructure IP network with a group of computerized mobile receiving stations according to their geographical status. For a mobile station to newly receive messages, this method comprises the steps of:
- receiving an IP unicast message termed geographical message in a central station, this geographical message representing at least the current geographical position of at least one such mobile receiving station;
- Processing this geographical position for issuing at least one IP multicast address, termed joining address, associated with a multicast group related to this geographical position, and possibly other multicast addresses associated with groups related to the neighbouring zones;
- determining at least one router device (e.g. the router managing the nearest base station) on a communication route from this central station to at least one wireless communication base station capable of communicating with this mobile station; and
- transmitting this joining address to this at least one router device in an IP unicast message, termed subscribing message, this subscribing message including a command for this router device to receive and manage IP multicast data frames directed to this joining address, and possibly with the addresses of the groups related to the neighbouring zones.

In response to this subscribing message, typically a "join_group" message according to the IGMP standard, the router device then prepares itself for accepting and forwarding all data frames intended to the concerned multicast group. A classical "flood & prune" process within the multicast IP network may then build the routing tree for delivering the corresponding multicast data frames to this router device, which forwards them to the wireless base station serving this mobile receiving station (i.e. currently communicating with it). This enables any user of the network to use said requested multicast address for selectively communicating through said wireless infrastructure IP network with a group comprising this at least one mobile station, i.e. with all stations of this group and only these stations.

The invention thus enables a reduction or optimization of the data traffic caused by the mobile station joining the multicast group.

The network managing method may furthermore comprise a step of checking whether or not the router device already receives and manages the IP multicast data frames which are intended for the joining address, and/or checking whether it forwards them towards through a gate towards this base station. The subscribing message is transmitted to the router device only in the negative case.

This furthermore enables avoiding the creation of supplementary traffic in the network for every new mobile station joining a cell or router which is already provided with the local multicast group data frames transmitting.

For a mobile station to quit receiving messages, this method comprises the steps of:
- receiving an IP unicast message termed geographical message in a central station, this geographical message including a current geographical position of at least one mobile station;
- determining at least one router device managing a wireless communication base station serving a given zone, termed left cell, not anymore relevant for communicating with this mobile station;
- for at least one IP multicast group related to this geographical position (and possibly other groups related to each of the neighbouring zones), termed pending group, received and managed by this router device, checking whether or not this left cell is still relevant for communicating with another mobile or fixed wireless station receiving the messages for this pending group; and
- in the negative case, transmitting towards this at least one router device an IP unicast message, termed unsubscribing message, including the multicast address of this pending group. This unsubscribing message includes a command for this router device not to receive nor manage anymore the IP multicast data frames directed to this pending group (and possibly directed to any of the groups related to the neighbouring zones).

In response to this unsubscribing message, typically a "leave group" message according to the IGMP standard, the router device will then stop forwarding to this base station any data frames intended to the concerned multicast group. At central station level, the communicating method according to the invention comprises associating each cell of plurality of geographical cells with an IP multicast group, thus with an IP multicast address. The network managing method comprises associating each cell with at least one base station and at least one router.

In the same scope, the invention also provides a method for implementing a location-aware service. According to the invention, this method comprises the steps of:
- receiving at least one service request related to a given geographical requested zone;
- computing at least one IP multicast group related to this requested zone;
- using a communication as disclosed above for communicating with at least one computerized mobile receiving station of a geographical status related to said requested zone.

Various architectures may be implemented within such a method, such as:
- any requester communicating with a group of mobile stations located in the requested zone (or heading to, or passing by, or interested in this zone). This is the case of a taxi management service.
- a group of mobile stations receiving information from any remote station regarding a requested zone, e.g. where these mobile station are currently located (or heading to or passing by). This is the case with a service providing localized traffic or local information regarding several zones, such as meteorological information or movie theatre programs or schedules.
- a mobile station communicating with a group of other mobile stations located or interested in a requested zone, such as a vehicle driver asking for assistance in his local area.

In an optional configuration possibly mixed with this one, the invention may also provide that: on the one hand, every router is subscribed only to the group for the cell it manages; and on the other hand, the central station has the choice to select one or several multicast groups for cells adjacent or related to the requested or targeted position, supplementary to the multicast group of the targeted cell.

The invention thus enables the implementation of such location-aware services in a more simple and robust manner, leaving the network totally or almost unchanged. The invention also enables the modification of network without taking into account such service implementation. Any change in the network configuration mostly just needs to be updated into the central station.

Receiving stations may be implemented through simple configuration of standardized devices, such as an off-the-shelf mobile unit with GPS receiver, and needs few or no further updating for using such services. Working these receiving stations is simple and transparent for the users, which do not need to be reminded or updated with lists of localized addresses. Evolution of the network but also of the central station may be done without updating or hindering the receiving stations. All receiving station users receive only relevant messages related to their current geographical status, e.g. current position or destination.

Communicating with such different localized groups is simple whatever the number of receiving stations in each group. Also, such stations need not be individually identified or monitored for receiving relevant messages. Anonymous receiving stations may be called or informed with the mere knowledge of their geographical position or status. A central station may also compute the number of receiving stations declared in every geographical zone, for the need of any service based on this geographical network system.

Using an IP multicast infrastructure network is a new way of implementing location-aware services for groups of mobile or wireless stations. This enables taking advantage of efficiency and stability of known infrastructure networks through IGMP managing of IP addresses, especially when compared with ad-hoc networks.

An area, e.g. city, is divided into cells "JK", here A1 to C3. Each cell is associated with a multicast IP address (IP@k). Each vehicle of a family repeatedly sends (e.g. every 15 seconds) a geographical position (x,y) message (e.g. its own current position). Optionally, the vehicle can also include additional information like the destination position or the average current direction.

Based on the geographical position (x,y) of the vehicle, the central station sends back a "join_set" unicast message with the list of 'n' multicast addresses (for example the 9 addresses corresponding to the 8 cells around the cell plus the cell where the vehicle is).

The central station also sends an IGMP "join_group" message, termed subscribing message, to the router controlling the cell (only once for the first "join_set" message) to allow the router to keep on forwarding the range of multicast addresses in the cell.

The algorithm on the central station to compute the list of multicast addresses per vehicle integrates at least the current location of the vehicle (x,y) and optionally the destination location (dest_x, dest_y) and/or the average vehicle direction.

On reception of the "join_set" message, each vehicle configures its receiving device to accept frames for the 'n' multicast addresses (remove old ones/add new ones).

Based on the received IGMP "join_group" message, each router in a 'cell' (or managing base stations covering a cell) keeps the list of multicast addresses used for the cell (this cell and the neighbours' multicast IP@'s). Dynamic protocols (PIM-DM, DVMRP, MOSPF) are used to advertise them all along the tree from destination to source. Standard multicast pruning takes place to keep only multicast @'s to be forwarded.

Each vehicle will receive radio messages only for the 'n' multicast addresses he is listening to.

Figure 1:
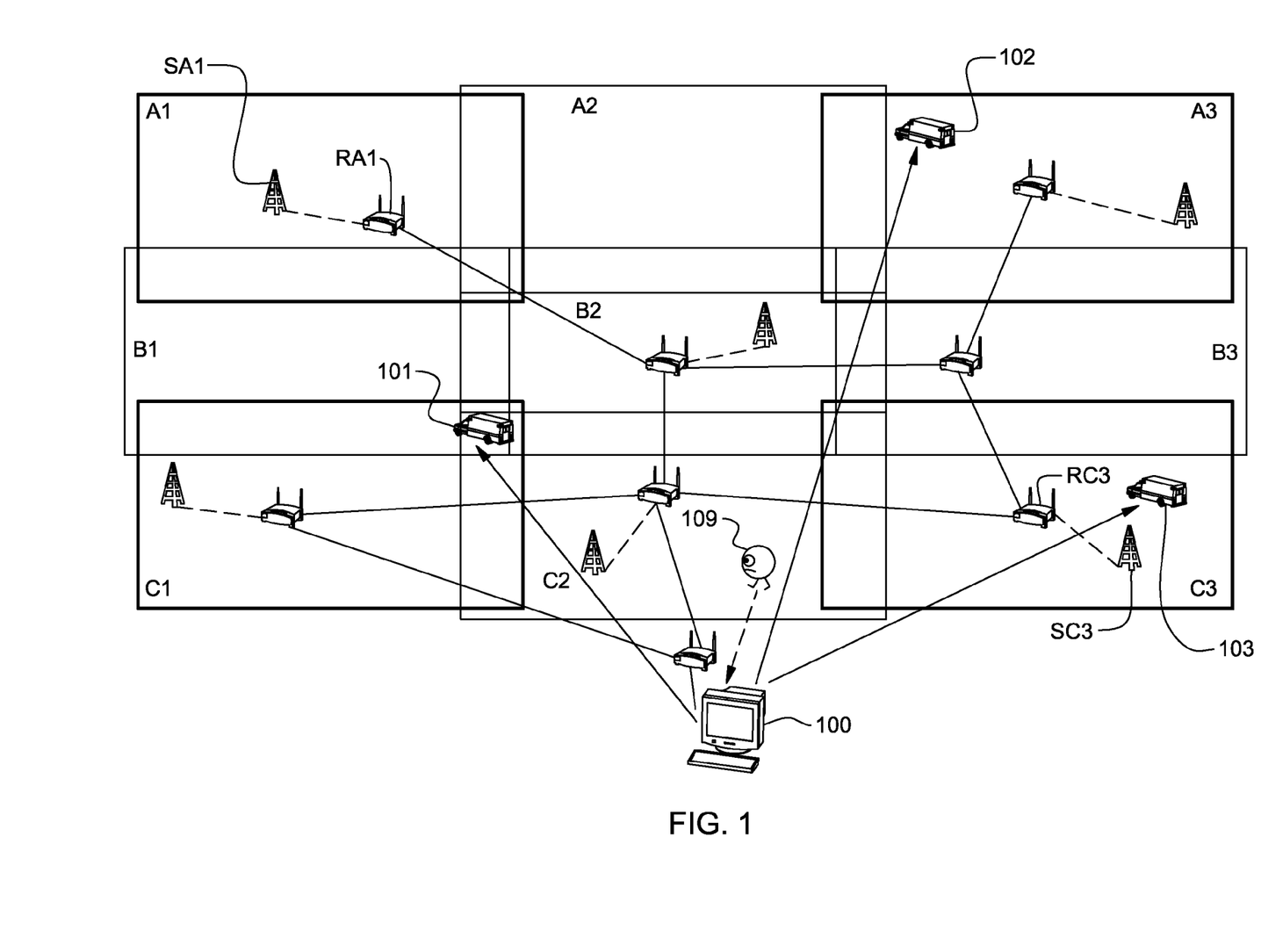
FIG. 1 is a schematic view of an architecture for a location-aware service according to the invention, in a first example embodiment with a central station calling localized vehicles according to the need of a requester.

A more detailed example of communication according to the first example embodiment of the invention of FIG. 1, is thereafter chronologically described for an example case of behaviours and events within the system.

Figure 2:
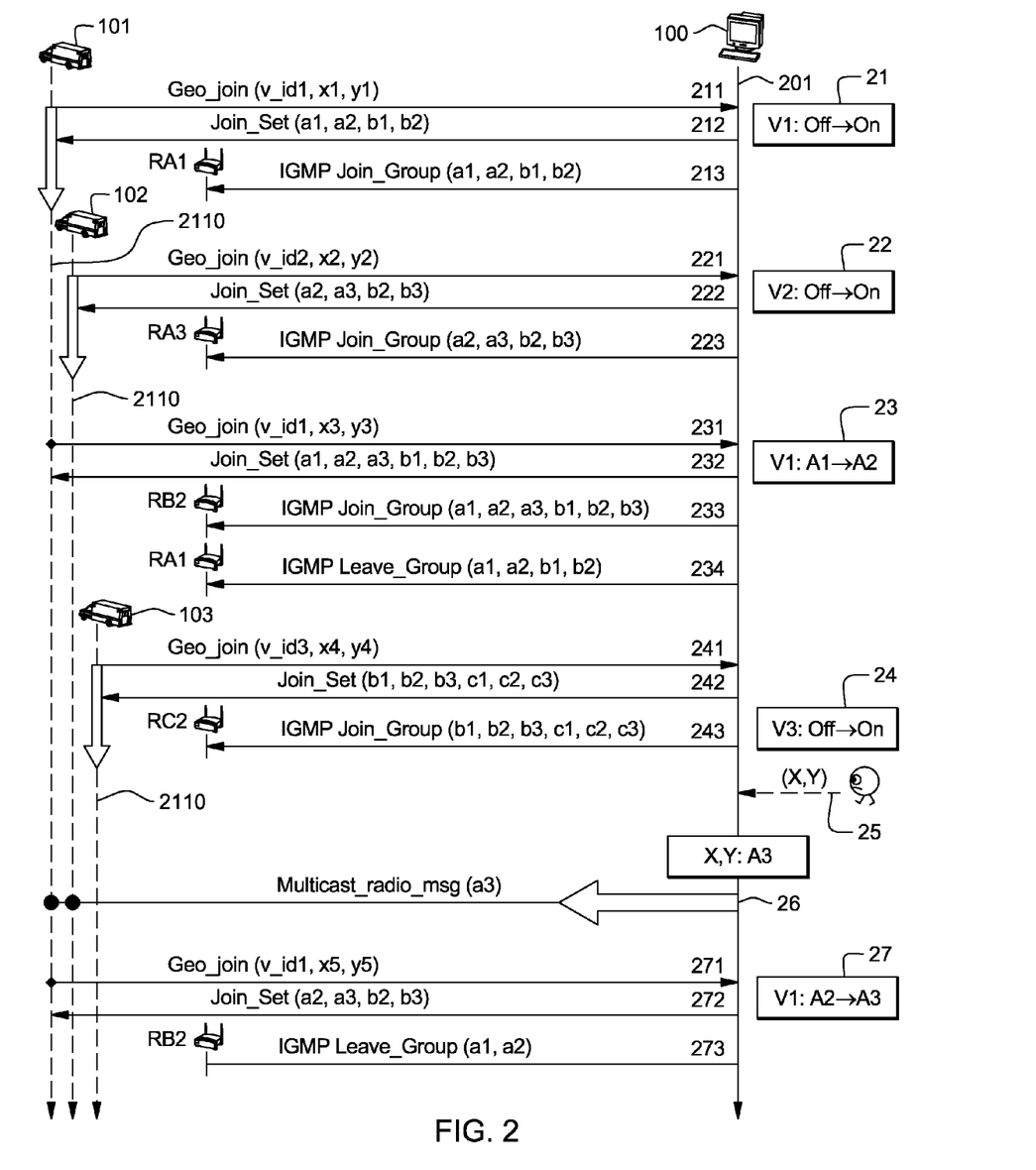
FIG. 2 is chronological representation of communication according to the invention in the first example embodiment of FIG. 1.

In FIG. 2, such successive behaviours and events 21 to 27 are represented on the right side of the figure, in a chronological succession along a vertically descending timeline 201 corresponding to the central station 100.

Successive messages transmitted within the system are represented by horizontal arrows between vertical positions corresponding to their emitters and receivers.

In an event 21, a first vehicle (V1) 101 activate its mobile station device.

Figure 3:
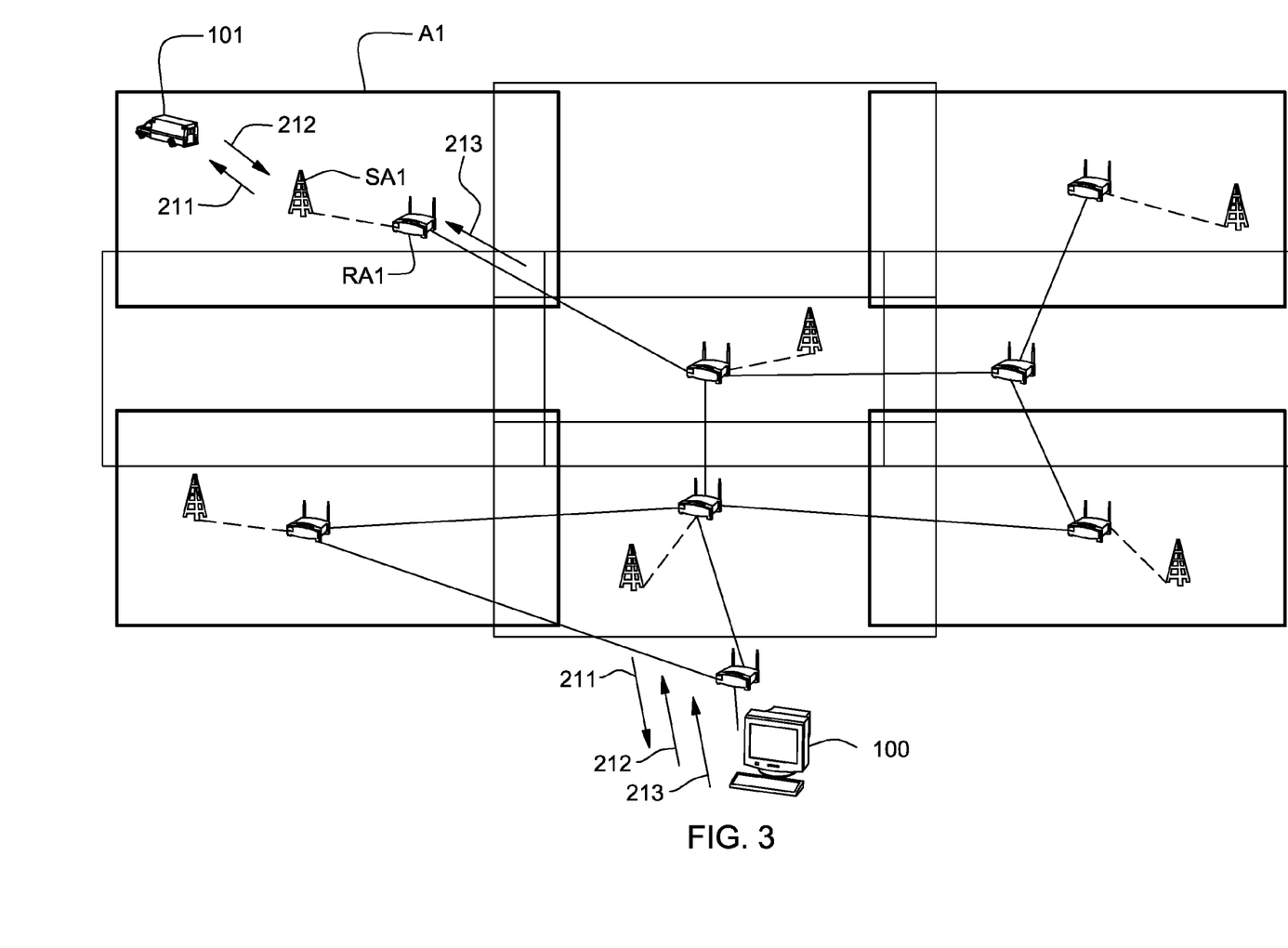
FIG. 3 to FIG. 7 are schematic geographical views of different states of the network along the chronology of the communication of FIG. 2, FIG. 3 on appearance of a first vehicle, FIG. 4 on appearance of a second vehicle, FIG. 5 after first vehicle changing cell, FIG. 6 on appearance of a third vehicle, FIG. 7 after first vehicle changing cell.

The FIG. 3 represents a geographical view of the system for this event 21.

On activation, the device of the vehicle 101 emits a geographical unicast message 211 through the wireless base station SA1 and the router RA1 up to the central station 100. This geographical message 211 comprises the syntax "Geo_join (v_id1, x1, y1)", where:
Geo_join means a request for joining the mobile communication system, v_id1 represents an identification of the V1 vehicle (101), x1 and y1 represents the current position of the V1 vehicle 101.

In response to this geographical message 211, the central station 100 computes a list of IP multicast addresses a1, a2, a3 and a4 corresponding to the cells A1, A2, B1 and B2 related to the current position (x1, y1) of the vehicle 101.

This list of addresses is emitted in a joining message 212 of the unicast type comprising a "Join-set" syntax.

In response to this "join_set" syntax of the joining message 212, the mobile station device of the vehicle 101 is automatically tuned or configured for receiving every multicast data frame and message intended for the addresses a1, a2, b1 and b2 received with the "join_set" syntax.

In conjunction to sending the joining message 212, the central station checks its memory for the number of vehicles already communicating through the router device RA1 that forwarded the received geographical message 211.

As no vehicle was previously using this router for receiving the multicast groups listed in the joining message 212, the central station 100 also sends a subscribing message 213 to this router RA1. This subscribing message 213 comprises a list of the addresses (a1, a2, b1 and b2) which are to be received by vehicles in the cell, along with syntax "Join_group" for ordering the router to listen to these multicast addresses and to forward the corresponding data frames to the base station SA1.

All along the activated duration 2110 of its mobile station device, the vehicle 101 keeps computing its current position (and/or position it is interested in) and sending repeatedly an updated unicast geographical message to the central station 100, e.g. every 15 seconds.

Figure 4:
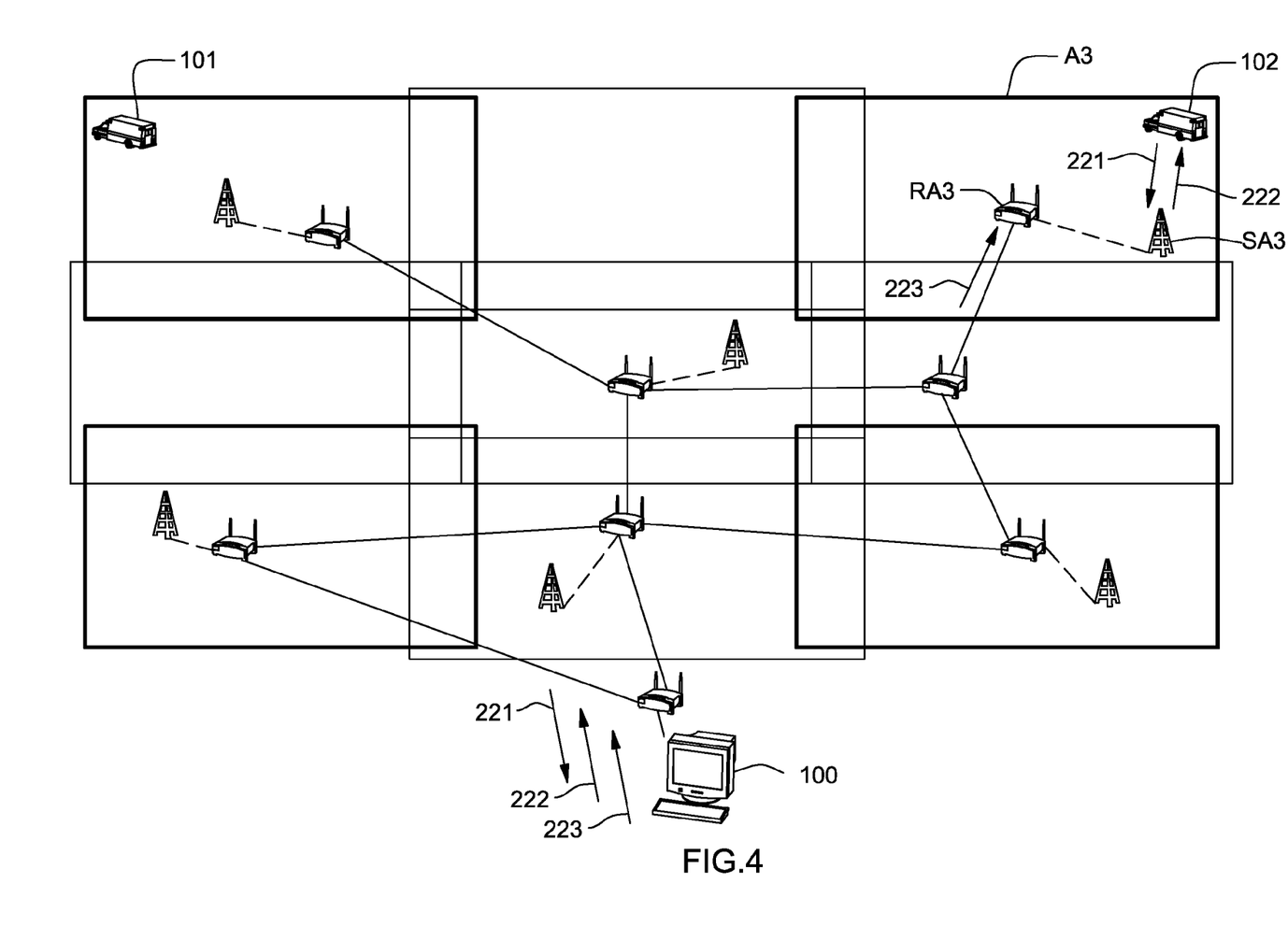

As illustrated in FIG. 4, an event 22 occurs when a second vehicle (V2) 102 activate its mobile station device. Similarly to the processing of the event 21, vehicle 102 sends in unicast mode a geographical message 221 to the central station with his identification and the position he is interested in (here his current position x2, y2 in cell A3): "Geo_Join(v_id2, x2, y2)"

The vehicle 102 then receives from the central station 100 a unicast joining message 222 with the list of multicast addresses for the cells corresponding to the requested position x2, y2: "Join_set(a2, a3, b2,b3)".

Also, the central station 100 sends a subscribing message 223 to the router RA3 managing the base station SA3 communicating with the vehicle 102: "Join_Group (a2, a3, b2, b3)". In an event 23 leading to FIG. 5, the V1 vehicle 101 moves from cell A1 to the cell A2.

Figure 5:
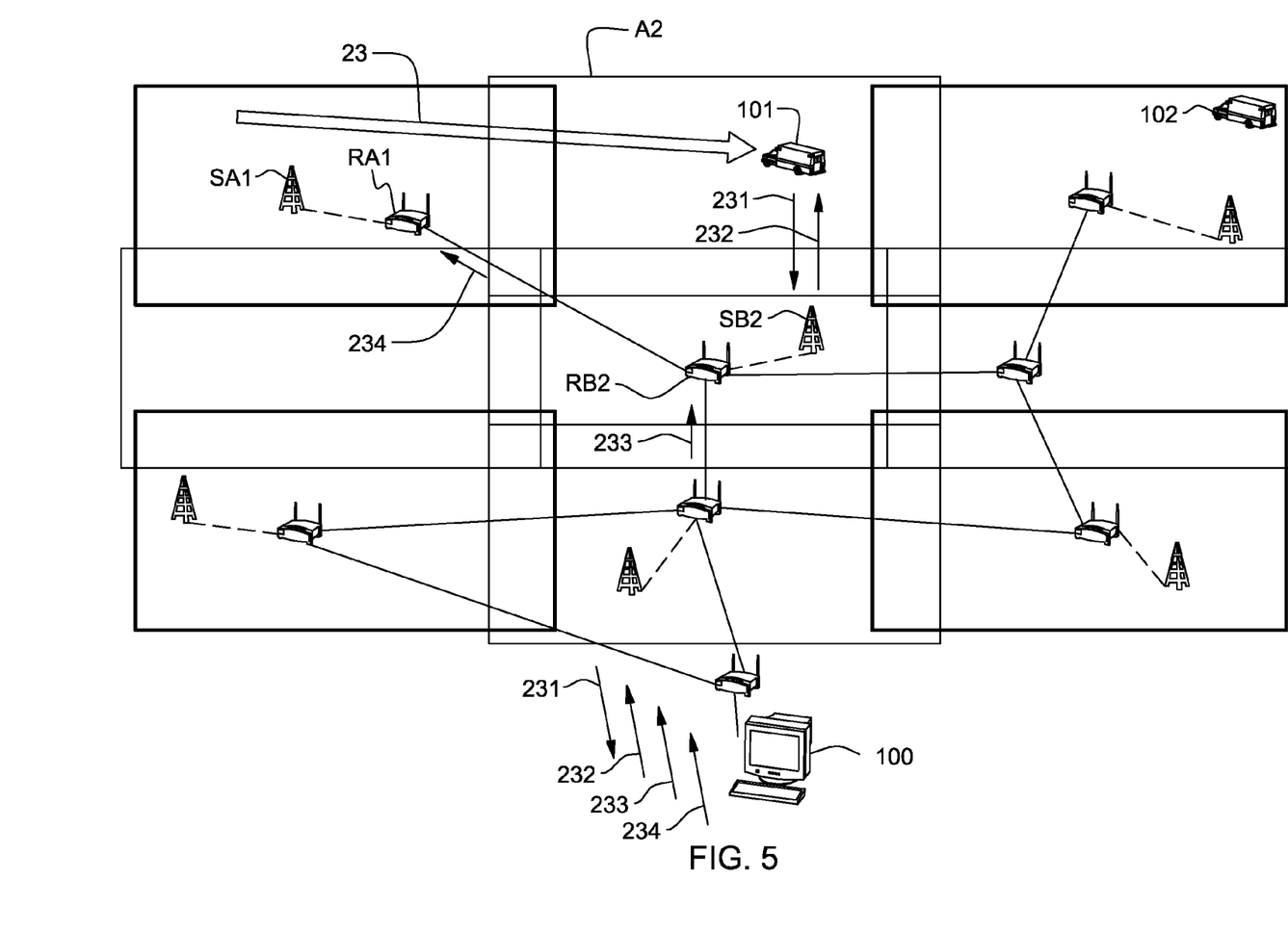

On the next reception of a geographical message 231 ("Geo_Join, v_id1, x3, y3") from vehicle 101, the central station 100 detects that the received position (x3, y3) pertains to a new cell A2. A joining message 232 is then transmitted to the vehicle 101 with a new list of multicast addresses pertaining to its new position: "Join_Set (a1, a2, a3, b1, b2, b3)"

In response, the receiving station of vehicle 101 automatically configures its communication means for receiving the new addresses a3 and b3 in addition to the already received addresses a1, a2, b1 and b2.

In parallel, the central station 100 determines that the current position x3, y3 of vehicle 101 is to be served by wireless base station SB2 managed by router RB2, in replacement of base station SA1 and router RA1.

Thus, a unicast subscribing message 233 is sent to the new router RB2 for subscribing it according to IGMP to the groups in which vehicle 101 is interested in: "Join_Group (a1, a2, a3, b1, b2, b3)". Also, as no vehicle is anymore in need of communicating with the previous base station SA1, an unicast unsubscribing message 234 is sent to the previous router RA1 for unsubscribing it from the previously received groups: "Leave_Group (a1, a2, b1, b2)".

In an event 24 (FIG. 6), a third vehicle (V3) 103 activate its mobile station device. Similarly, vehicle 103 sends in unicast mode a geographical message 241 to the central station with his identification and the position he is interested in (here his current position x4, y4 in cell C2): "Geo_Join(v_id3, x4, y4)"

Figure 6:
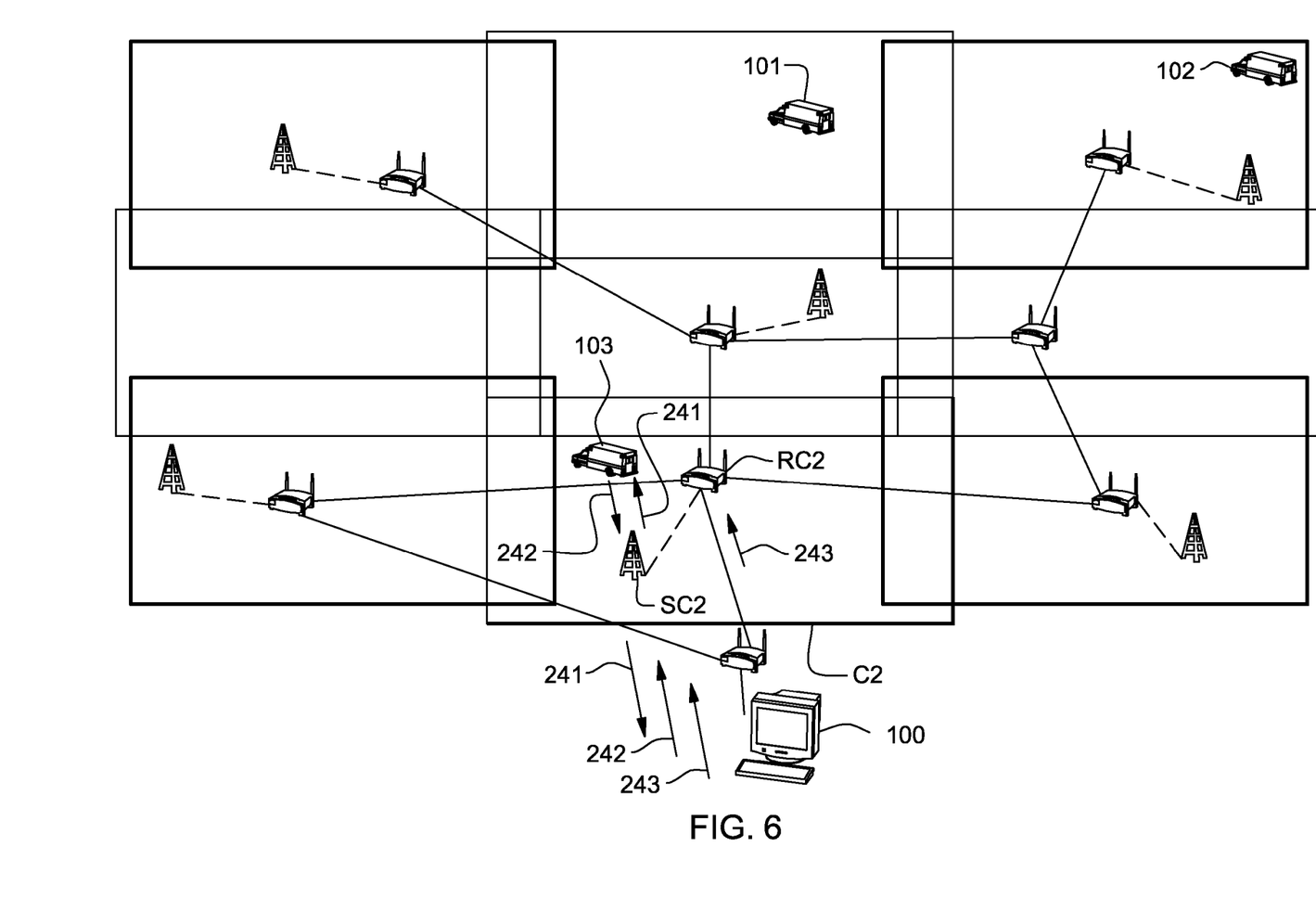

The vehicle 103 then receives from the central station 100 a unicast joining message 242 with the list of multicast addresses for the cells corresponding to the requested position x4, y4: "Join_Set (b1, b2, b3, c1, c2, c3)". Also, the central station 100 sends a subscribing message 243 to the router RC2 managing the base station SC2 communicating with the vehicle 103: "Join_Group (b1, b2, b3, c1, c2, c3)".

In an event 25, a request is received for a taxi-lift from a position X, Y. The central position determines that this requested position is located in cell A3, and selects the IP multicast address a3 corresponding to the cell A3. Optionally, or in a second call, one or several addresses may be selected, such as addresses (a2, b2, b3) for the cells (A2, B2, B3) surrounding the cell A3 of the requested position X, Y.

In an event 26, the central station sends a multicast radio message to the multicast group with the selected address(es) a3, with information on the requested service and position (X, Y).

As vehicles 101 and 102 are currently receiving the multicast group a3, they both receive this message. Other vehicles such as V3 vehicle 103 do not receive this irrelevant message as they do not receive this selected multicast group a3. Any of these vehicles 101 and 102 may then call the central station 100 or any other dispatcher operator with any means, such as unicast radio messages.

In an event 27 (FIG. 7), the V1 vehicle 101 moves from cell A2 to the cell A3. On the next reception of a geographical message 271 ("Geo_Join, v_id1, x5, y5") from vehicle 101, the central station 100 detects that the received position (x5, y5) now belongs to the cell A3, and does not pertain anymore to the cell A2. It has to be noted that events of entering a new cell A3 and leaving the previous cell A2 may occur separately, because of the overlapping of the cells.

Figure 7:
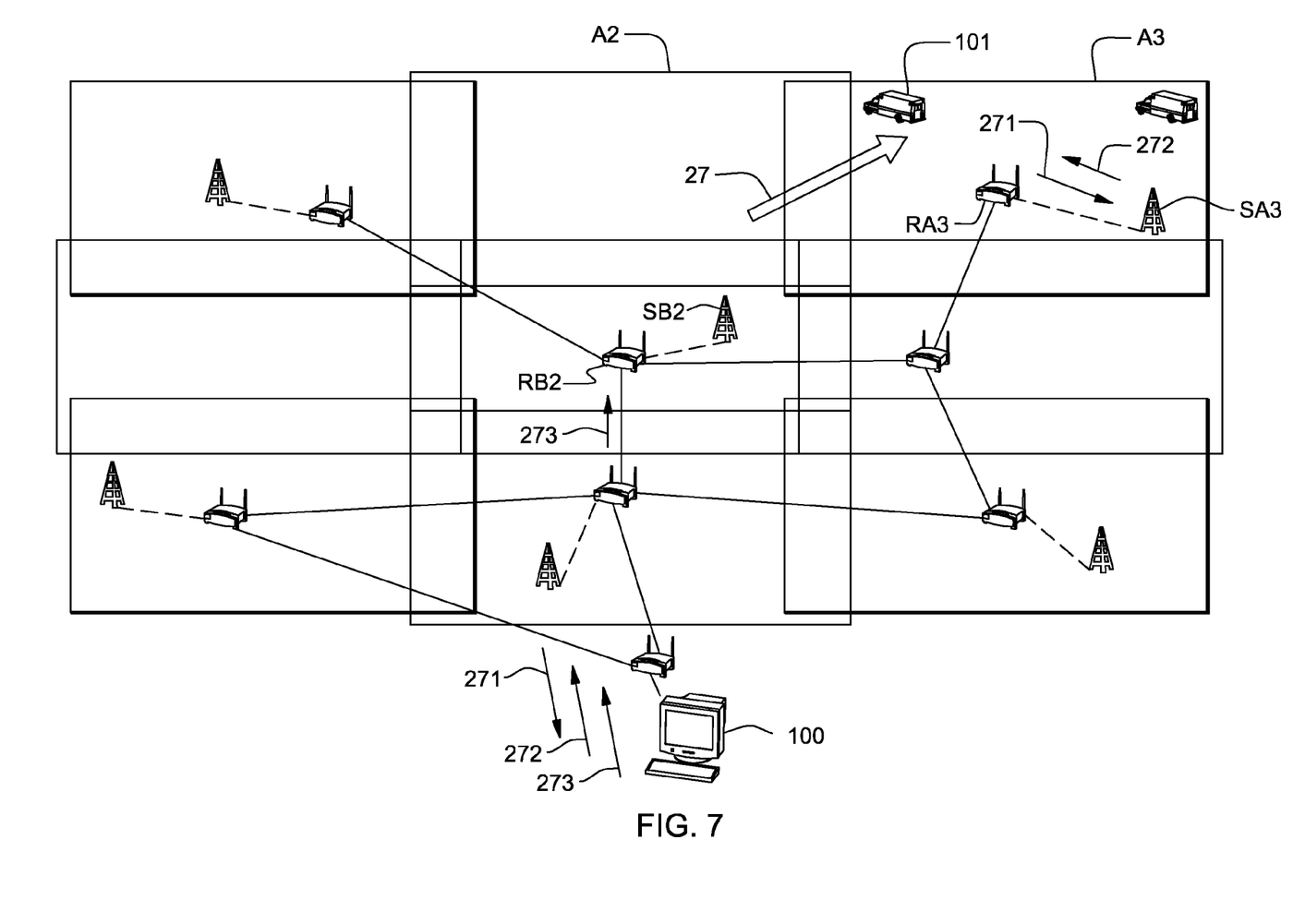

A joining message 272 is then transmitted to the vehicle 101 with a new list of multicast addresses pertaining to its new position: "Join_Set (a2, a3, b2, b3)" In response, the receiving station of vehicle 101 automatically configures its communication means for not receiving anymore the addresses a1 and b1, but only the group addresses a2, a3, b2 and b3.

In parallel, the central station 100 determines that the current position x5, y5 of vehicle 101 is to be served by wireless base station SA3 managed by router RA3, in replacement of base station SB2 and router RB2.

As the groups (a2, a3, b2, b3) listened to by vehicle 101 are already received and forwarded by router RA3 et base station SA3 since vehicle 102 activated in the same cell A3, the central station 100 does not need to send any subscribing message to this router RA3.

However, the central station determines that there is no receiving station anymore listening to the groups a1 and b1 previously received and forwarded by router RB2 and base station SB2. Thus, a unicast unsubscribing message 273 is sent to this router RB2 for unsubscribing it, according to IGMP, to these relinquished groups: "Leave_Group (a1, b1)". Such unsubscribing message will be sent either for all received groups when no vehicle is anymore present in the served area, and also for selected received groups in which the present vehicles are not anymore interested in.

PREFERRED EMBODIMENT OF THE INVENTION

As illustrated in FIG. 1, a first example of embodiment comprises communicating with a fleet of vehicles according to their geographical position within a given area. A typical application is the communication between a central station 100 with a fleet of taxis 101, 102 and 103, according to geographical criteria. Within an area covered by an IP multicast infrastructure network, such as an urban perimeter, geographical cells A1 to C3 are defined and each cell is affected with a specific multicast IP address.

The IP multicast infrastructure network may typically conform to the Internet Group Management Protocol (IGMP). It comprises several wireless base stations SA1, SA3, SB2, SC1, SC2 and SC3. Each of these base stations is serving one or more cells for IP radio communicating with mobile receiving stations operating in the fleet vehicles. Each base station is managed by a router devices RA1 to RC3 included in an IP multicast network of a known type.

According to the invention, vehicles are assigned into several logical groups according to their geographical position. When a requester 109 calls the central station for sending a taxi to his position in cell C2, the central station sends a multicast radio message to the multicast address corresponding to the zone in which the requester wants the taxi, i.e. the cell C2. All taxis currently within this cell C2 or in the adjacent cells, in the present case taxi 101, receive this multicast message, and other taxis 102, 103 which are not in these cells are not disturbed by this irrelevant message.

Every active taxi 101 repeatedly and regularly transmits his position by communicating with a local base station SB2 through wireless communicating means. A local router device RB2 forwards this information to a central station 100 through the IP network. For each taxi, the central station 100 returns through the IP network a specific list of IP multicast addresses. This list is computed by the central station 100 and comprises IP multicast addresses corresponding to one or several different cells surrounding the position of the taxi.

In the example disposition of FIG. 1, these lists may be defined as follows:
  Taxi 101 is in cells B1, B2, C1 and C2, as cells are defined with some overlapping for a thorough covering of the global area: IP multicast addresses are sent to taxi 101 for cells A1 to A3, B1 to B3 and C1 to C3;
  Taxi 102 is in cells A3: addresses are sent for cells A2, A3, B2, B3;
  Taxi 103 is in cell C3: addresses are sent for cells B2, B3, C2 and C3.

At the level of the router RC3 managing the base station SC3 serving the cell C3 or the position of each taxi 103, the central station 100 make so as to have this taxi 103 subscribed to the multicast groups of all addresses sent to this taxi 103, i.e. groups for cells B2, B3, C2 and C3. The local router RC3 is subscribed to these groups as soon as there is at least one taxi in the serving zone of any one SC3 of the base stations managed by this router RC3.

If there is no taxi in a cell A1, then the router RA1 managing the base station SA1 serving this cell A1 will not be subscribed to any group, and will be unsubscribed to any group it was previously subscribed to. If the addresses sent to the taxi 103 correspond to the geographical groups (i.e. B2, B3, C2, C3) surrounding its current position (C3), the list of addresses subscribed by a router RC3 may correspond to the cells surrounding the base stations SC3 it manages. However, if a taxi 103 situated in a given position C3 is interested in (and subscribed to) geographical groups somewhere else (e.g. its destination or next waypoint (e.g. A1) then the addresses subscribed to (i.e. A1) by the router RC3 managing its current position C3 may differ from the addresses for cells surrounding this router RC3 or its base station SC3.

The invention thus enables a dynamic evolution of the network configuration by the sole modification of the central station 100, with no need to update the functionality of the network itself.

It is interesting to notice that the implementing of the invention is transparent for the taxis, as most of the intelligence of the system is in the infrastructure. Moreover, the invention may use the existing infrastructure, particularly the IP multicast network and many types of wireless infrastructures, as the intelligence specific to the application is managed, processed and memorized in the central station. This central station only needs to emit standard messages, of unicast or multicast type, according to the current standards of such IP multicast networks.

Similar applications may be implemented according to the invention for communicating with other kind of mobile receiving stations, such as: breakdown trucks or mechanics, vehicle removal trucks, ambulances, police or security vehicles or individuals, firemen vehicles, and various other kind of fleets or groups of vehicles or mobile intervention entities.

Alternative Embodiments and Applications

In alternative embodiments, several features of the invention may be implemented under different forms, possibly combined with features of the preferred embodiment. Such alternative embodiments may include the following features.

For a mobile receiving station transmitting its position as geographical status, the joining message may also be emitted by the local wireless base station or its managing router. Moreover, the IP multicast addresses related to this geographical status (e.g. for the current position and the neighbouring zones) may be memorized within the base station or the router and automatically transmitted in response to a simple geographical message. An example of a sufficient simple geographical message may be a simple request with identification of the mobile station, or even a mere signal of presence.

The unsubscribing message may also be transmitted to the router device by the base station in which are memorized the IP multicast addresses of groups related to this geographical position, when it detects that such a pending group is not anymore listened to in a given cell. Thus, the method furthermore comprises the steps of:
  transmitting the geographical message from the at least one mobile receiving station through wireless communication with at least one base station, said base station forwarding said geographical message to the network; and
  the base station transmitting to the central station identification or reception data related to the geographical status of said mobile receiving station.

Figure 8:
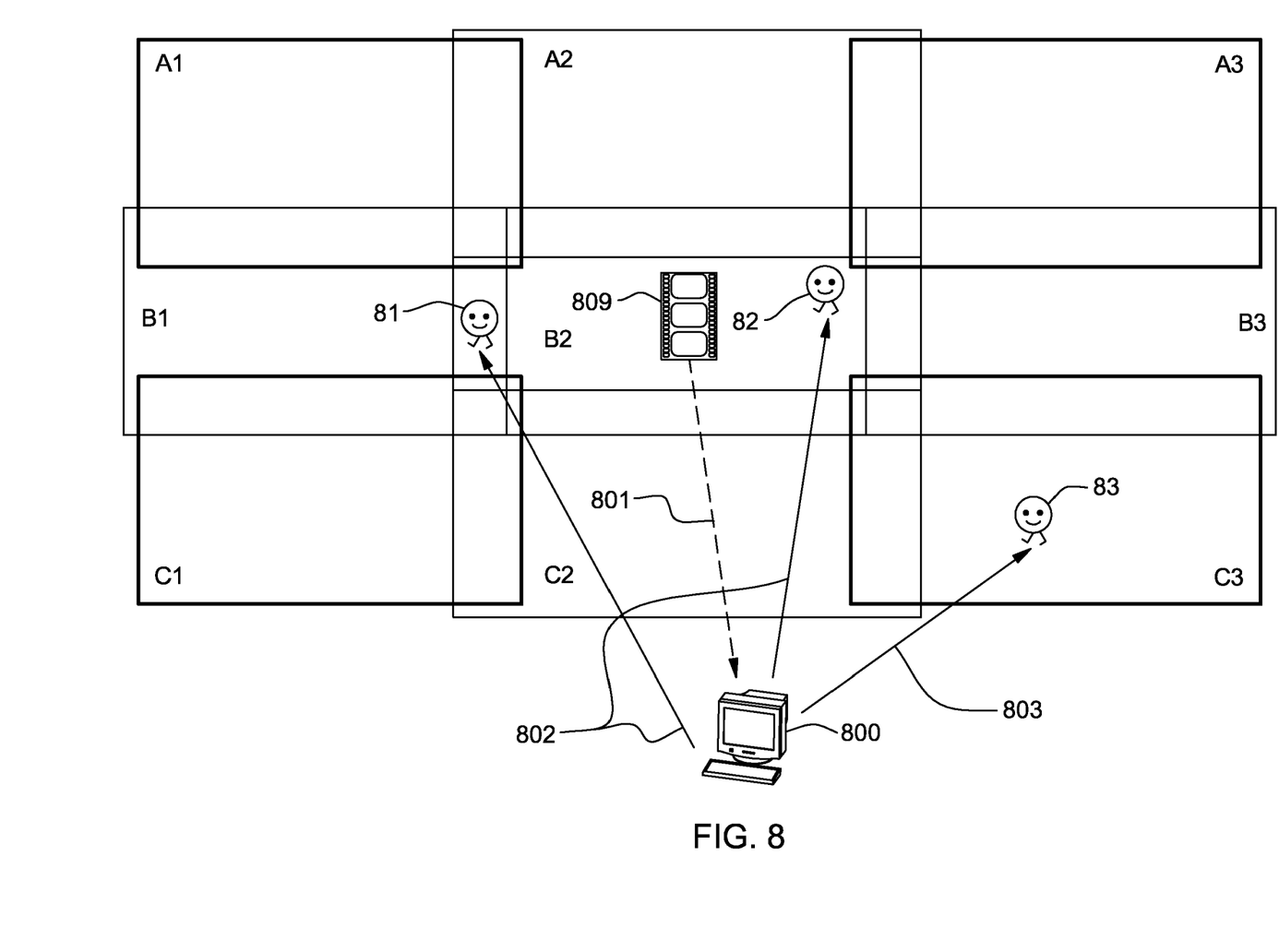
FIG. 8 is a schematic view of architecture for a location-aware service according to the invention, in a second example embodiment with a central station sending localized information to mobile requesters according to their positions.

While the invention has been particularly shown and described mainly with reference to a preferred embodiment, it will be understood that various changes in form and detail may be made therein without departing from the spirit, and scope of the invention. Especially, any kind of mobile receiving stations may be involved, including cars or trucks or boats or planes, as well as portable wireless computerized device held or transported by pedestrians. An example of alternative or complementary application is shown in FIG. 8 for a location-aware service according to the invention. Similarly to the preferred embodiment described above, an area served by an infrastructure wireless multicast IP network is divided into several cells A1 to C3.

A central station 800 receives and memorizes permanent and real time updated information on several places, such as the current schedule and available possibilities of a movie theatre 809. Similarly to the preferred embodiment described above, numerous mobile receiving stations such as pedestrians 81, 82 and 83 send geographical messages 811, 821 and 831 to the central station 800, repeatedly or through discreet requests. According to their varying respective positions, they receive corresponding joining messages 812, 822 and 832 from the central station 800. Regularly, or on events, the central station send different multicast messages 802 and 803 to each multicast group, corresponding to each cell. Each of these multicast messages comprises information related to the corresponding cell.

In the shown example, information on the movie theatre 809 are included in the multicast message 802, but not in the multicast 803. Thus persons 81 and 82 located in the cell B2 receive information on movie theatre 809 through multicast message 802, while person 83 located in cell C3 does not receive such information.

What is claimed is:

1. A method for selectively communicating through an infrastructure IP network with a group of computerized receiving stations according to their geographical status, said method comprising:

dividing a geographical area into a plurality of geographical cells, each cell being a unique geographical region within the geographical area, each cell being associated with one and only one unique joining address of a plurality of joining addresses, a totality of joining addresses in a joining message consisting of the one and only one unique joining address to which each cell is associated, a receiving station located in one cell of the plurality of cells periodically transmitting a geographical message to a central station in accordance with a schedule, said geographical message being an IP unicast message comprising a current geographical status of the receiving station;

in response to transmitting one geographical message of the periodically transmitted geographical messages, said receiving station receiving the joining message from the central station, said joining message being an IP unicast message comprising the plurality of joining addresses, each joining address being a unique multicast IP address associated with a corresponding multicast group related to the current geographical status; and after said receiving the joining message, said receiving station receiving all and only messages received at the joining addresses via a wireless infrastructure IP network.

2. The method of claim 1, wherein the all and only messages received by the receiving station consist of multicast data frames.

3. The method of claim 1, wherein the receiving station comprises a moving vehicle.

4. The method of claim 3, wherein the geographical message comprises an identification of the vehicle and a current direction in which the vehicle is moving.

5. The method of claim 3, wherein the schedule is dependent upon a speed characteristic of the vehicle.

6. The method of claim 3, wherein the schedule is dependent upon a distance traveled by the vehicle.

7. The method of claim 3, wherein the current geographical status is a geographical destination of the vehicle.

8. The method of claim 3, wherein the current geographical status is a geographical origin of the vehicle.

9. The method of claim 1, wherein the current geographical status is a three-dimensional spatial position in an underwater zone.

10. A system, comprising a receiving station configured to implement a method for selectively communicating through an infrastructure IP network with a group of computerized receiving stations according to their geographical status, said method comprising:

dividing a geographical area into a plurality of geographical cells, each cell being a unique geographical region within the geographical area, each cell being associated with one and only one unique joining address of a plurality of joining addresses, a totality of joining addresses in a joining message consisting of the one and only one unique joining address to which each cell is associated, said receiving station located in one cell of the plurality of cells periodically transmitting a geographical message to a central station in accordance with a schedule, said geographical message being an IP unicast message comprising a current geographical status of the receiving station;

in response to transmitting one geographical message of the periodically transmitted geographical messages, said receiving station receiving the joining message from the central station, said joining message being an IP unicast message comprising the plurality of joining addresses, each joining address being a unique multicast IP address associated with a corresponding multicast group related to the current geographical status; and after said receiving the joining message, said receiving station receiving all and only messages received at the joining addresses via a wireless infrastructure IP network.

11. The system of claim 10, wherein the all and only messages received by the receiving station consist of multicast data frames.

12. The system of claim 10, wherein the receiving station comprises a moving vehicle.

13. The system of claim 12, wherein the geographical message comprises an identification of the vehicle and a current direction in which the vehicle is moving.

14. The system of claim 12, wherein the schedule is dependent upon a speed characteristic of the vehicle.

15. The system of claim 12, wherein the schedule is dependent upon a distance traveled by the vehicle.

16. The system of claim 12, wherein the current geographical status is a geographical destination of the vehicle.

17. The system of claim 12, wherein the current geographical status is a geographical origin of the vehicle.

18. The system of claim 10, wherein the current geographical status is a three-dimensional spatial position in an underground zone.

* * * * *